US005475597A

United States Patent [19]

Buck

[11] Patent Number: 5,475,597

[45] Date of Patent: Dec. 12, 1995

[54] SYSTEM FOR MAPPING OCCURRENCES OF PREDETERMINED CONDITIONS IN A TRANSPORT ROUTE

[75] Inventor: James C. Buck, Catonsville, Md.

[73] Assignee: AMSC Subsidiary Corporation, Washington, D.C.

[21] Appl. No.: 22,037

[22] Filed: Feb. 24, 1993

[51] Int. Cl.[6] .................................................. G06F 165/00

[52] U.S. Cl. .................... 364/443; 364/424.04; 340/988; 340/438

[58] Field of Search .................................... 364/443, 449, 364/424.03, 424.04, 566; 340/438, 439, 988

[56] References Cited

U.S. PATENT DOCUMENTS

| | | | |
|---|---|---|---|
| 4,188,618 | 2/1980 | Weisbart | 364/424.04 |
| 4,258,421 | 3/1981 | Juhasz et al. | 364/424.04 |
| 4,561,057 | 12/1985 | Haley, Jr. et al. | 364/424.04 |
| 4,688,026 | 8/1987 | Scribner et al. | 340/572 |
| 4,745,564 | 5/1988 | Tennes et al. | 364/566 |
| 4,793,477 | 12/1988 | Manning et al. | 206/232 |
| 4,884,208 | 11/1989 | Marinelli et al. | 364/449 |
| 5,014,206 | 5/1991 | Scribner et al. | 364/449 |
| 5,129,605 | 7/1992 | Burns et al. | 246/5 |
| 5,359,528 | 10/1994 | Haendel et al. | 364/424.03 |

*Primary Examiner*—Gary Chin
*Attorney, Agent, or Firm*—Lowe, Price, LeBlanc & Becker

[57] ABSTRACT

A system for mapping the occurrences of predetermined events or conditions along a transport route travelled by a mobile sensing station includes a central controller connected to the mobile sensing station over a first communication system such as a satellite communication system. The mobile sensing station continuously detects for occurrences of predetermined events or conditions so that a real-time indication of transport route conditions can be provided to a remote user connected to the central controller. The transmission of data regarding the occurrence of the predetermined conditions, time and date data corresponding to those conditions and positional data also corresponding to those conditions can be triggered using a variety of techniques.

36 Claims, 1 Drawing Sheet

SYSTEM FOR MAPPING OCCURRENCES OF PREDETERMINED CONDITIONS IN A TRANSPORT ROUTE

TECHNICAL FIELD

The present invention relates generally to monitoring conditions with respect to cargo on transport routes, and more particularly to a system for mapping the occurrence of predetermined conditions as detected by vehicles in real-time along such a transport route.

BACKGROUND ART

Damage to freight due to rough handling and road conditions is a costly situation. Rough handling can be caused by slack action within a train transporting freight, usually due to poor train handling or by coupling cars at excessive speeds. Rough handling and irregularities along the transport route create additional expenses by forcing shippers and customers to make considerable expenditures on blocking, bracing, and otherwise attempting to cushion the freight being transported. It is necessary to track instances of rough cargo handling and irregular transport routes to take appropriate measures to protect the cargo.

One system for monitoring conditions under which rough handling may be a problem is the use of hand-held radar for measuring coupling performance with respect to freight cars. This measuring system has several flaws. First, the radar operators are in plain view of the switch crews. Consequently, their normal performance may be altered. Second, there are not enough personnel to constantly monitor coupling speeds for the many freight cars required to be handled in order to ensure good coupling practices twenty-four hours a day, seven days a week. Further, the use of hand-held radar is typically dangerous and requires one person to make the readings and another to record them. This system is also inadequate for use along an entire transport route in which irregularities along either a rail route or paved road may contribute to cargo damage.

One proposed solution suggests the use of monitoring modules located on the vehicle itself for collecting and storing information. Such a system is described in U.S. Pat. No. 5,014,206 to Scribner et al. In this system the location of a vehicle is determined and recorded during the occurrence of events detected by sensors which respond to such an occurrence. The system is associated with navigational units to receive positional information from a navigation system. The location of the vehicle is stored in a data collector on the vehicle. The date and time of the events may also be stored along with the positional information. The position is determined by means of a navigation system such as GPS or LORAN. The stored information is later transported to an information delivery point and downloaded to a data processing system. Here the information is analyzed to determine the exact location and time of the occurrence of the events, such the closure of a passenger door of a taxi or bus, or the pickup of waste by a truck.

As illustrated in FIGS. 1 and 3 of Scribner et al., a truck 10 is equipped with a lift arm sensor 18 and rear door sensor 24 which are coupled electrically to a navigational system such as a GPS type system. The truck also has a passive radio transmitter in the form of tag 30 mounted on it. One such tag is described in U.S. Pat. No. 4,688,026 issued to the same inventors. The purpose of this transmitter is to transmit the truck identification number to a base data receiver/computer unit 32 which may be located at the depot where the truck is returned and housed. When the truck leaves the depot, an RF signal from the receiver/computer unit 32 causes the tag 30 to transmit the truck identification to the receiver/computer 32. The receiver/computer records the time, date and truck identification number. On returning to the depot the tag 30 again transmits the truck identification number to the data receiver/computer unit 32. The information contained in the data collector 28 may then be downloaded into the base receiver unit 32. This information may consist of (1) the identification number of the truck, (2) the day, time, latitude and longitude of each occurrence of the lift arm actuating its sensor, and (3) the day, time, latitude and longitude of each occurrence of actuation of the rear door sensor.

In order to properly protect cargo, the acceleration to which the cargo is subjected must be carefully controlled. U.S. Pat. No. 4,745,564 to Tennes et al. describes an impact detection apparatus for measuring and recording acceleration or other physical quantities experienced by easily damaged items of commerce such as fruit, or electronic computers. A triaxial accelerometer or other suitable sensor produces signals which are stored in a memory along with the times of the events which trigger the accelerometer. This provides an event-time history which later may be read from the memory for analysis after the handling or transportation is completed.

Control of the acceleration to which cargo carrying vehicles are subjected can be exerted as described in U.S. Pat. No. 5,129,605 to Burns et al. This document describes a vehicle positioning system using a plurality of inputs such as a GPS receiver, wheel tachometer, O.S. circuits, transponders and manual inputs from locomotive engineers.

Systems exist for continuously establishing and indicating the location of vehicles such as cars, trucks and boats. Such a system is described in U.S. Pat. No. 4,884,208 to Marinelli et al., which is directed primarily towards theft prevention. In this system a master tracking station receives and stores signals representative of the object identification and the location of the object, and may provide a visual indication of the object identification code and object location. Only vehicle location is detected.

The occurrence of events along a transport route is mapped out in U.S. Pat. No. 4,793,477 to Austill et al. However, this system does not include the use of a transmitter, from which information is downloaded into a central controller via a communication system. Nor is location information fed into a sensing module on the vehicle. Rather, the event location is determined by sensing and recording the degree and direction of track curvature for the rails on which the vehicle is travelling.

None of the aforementioned conventional systems provides the necessary attributes to map, in real-time, a cargo transport route with respect to conditions occurring on that route which may affect the cargo. In order to properly protect the cargo travelling along a route, it is necessary to have a timely knowledge of all conditions which might affect the cargo along that route. Such conditions can be natural or man-made, transient or steady state, and can be caused by interaction with other vehicles or individuals, or by the physical condition of the transport route itself. For such a system to be widely used, it must be effective for a variety of types of transport routes, and be able to supply information regarding all the parts of a given transport route over long distances. Such information should be immediately available upon request or the occurrence of an event of interest (affecting transported cargo) along the transport route. Further, overall conditions along the transport route with respect to such occurrences should be recorded for display and easily updated. The information should be immediately available over long distances without having to approach each vehicle carrying the means for sensing the occurrence of conditions of interest.

DISCLOSURE OF THE INVENTION

One object of the present invention is to provide timely mapping of entire cargo transport routes with respect to conditions impacting cargo being transported along those routes.

Another object of the present invention is to periodically trigger information regarding transport route conditions in a timely fashion so that it is possible to have real-time knowledge of conditions which impact upon cargo being transported along a particular transport route.

Yet another object of the present invention is to determine transport route conditions and the events along that route impacting upon cargo in a specific vehicle without having to approach that vehicle.

A further object of the present invention is to maintain a current record of a particular cargo transport route for immediate display upon request by a user remote from the storage location at which the transport route data is correlated and stored.

Still a further object of the present invention is to provide a system in which the location of a particular vehicle and the condition of its cargo can be accessed by a remote user upon demand.

These and other objects are accomplished using a method of mapping the occurrence of predetermined conditions along a transport route travelled by a mobile sensing station connected to a central controller via a first communication system. The mobile sensing station continuously senses for the occurrence of the predetermined conditions along the transport route. When these conditions are detected, data regarding these conditions are stored, as well as time and date data corresponding to the subject occurrences. Positional data is also received and correlated with the occurrence. The mobile sensing station is then triggered to transmit the correlated data over the communication system to a central controller. The correlated data is arranged so that a map of the transport route can be displayed, showing the locations of the predetermined conditions.

In a second embodiment of the present invention a system is used which includes at least one mobile sensing station mounted on a vehicle traversing a given transport route, a first communication system, and a central controller. The mobile sensing station includes means for continuously detecting occurrences of predetermined conditions along the transport route, means for receiving or detecting positional data, means for storing data, characteristics of the occurrences detected, as well as time and date data corresponding to each of the occurrences, means for correlating the positional data with corresponding occurrences of predetermined conditions, and first means for transmitting the correlated data in response to a triggering condition. The central controller includes means for receiving the correlated data via the first communication system, and means for displaying the correlated data so as to identify positions along the transport route at which the occurrences of the predetermined conditions are detected.

These and further objects and advantages of the invention will become more apparent upon reference to the following description, drawings and claims.

BEST MODE FOR CARRYING OUT THE INVENTION

Figure 1:
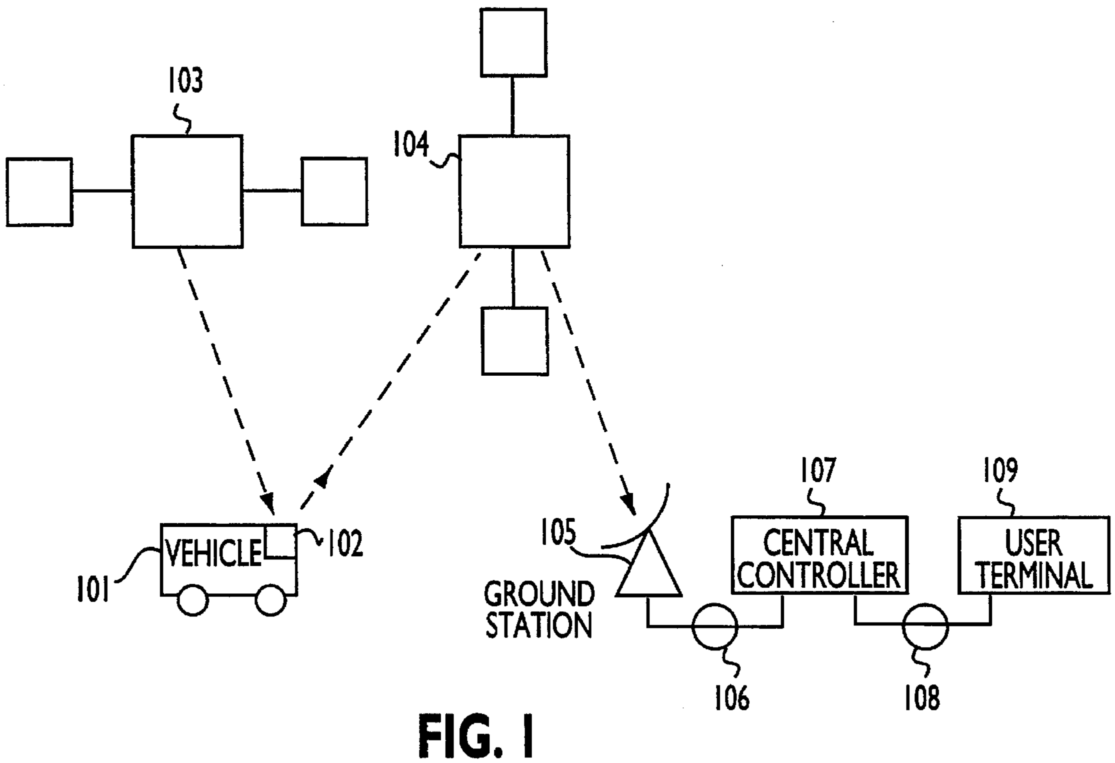
FIG. 1 is a diagrammatic illustration of an outline of the overall system of the invention.

FIG. 1 illustrates the general layout of a system for effectuating the present invention. A vehicle 101, usually transporting cargo, moves along a transport route. The route can be one that is well known, or it can be one that is being newly travelled by the vehicle. The vehicle carries at least one mobile sensing station 102, which functions to detect predetermined events or conditions (such as collisions or impacts, potholes or uneven tracks or the like) along the travel route, and transmit data regarding those conditions via orbiting satellite 104 to a remote ground station 105. The ground station transfers the data from the mobile sensing station to the central controller 105 through data link 106. A user terminal 109 can access data in the central controller via communications link 108.

Part of the data transmitted from the mobile sensing station is positional data received or detected from a satellite 103 which is part of a satellite navigation system. Examples of presently available systems are LORAN or the current Global Position System (GPS).

Preferably navigational data sent to the mobile sensing station utilizes a Standard-C data protocol format, which is commonly used in the maritime industry. Experience has indicated that this is the most reliable method of sending navigational data from one mobile station to another.

However, other navigation or location systems can be used. For example, a series of radio repeaters located along a predetermined route can track the location of a specific vehicle and can be used to send location data to the mobile sensing station 102 as is done by satellite 103 in FIG. 1. Also, other data transfer formats can be used, depending on the navigational system, the transport route, the vehicle and the communication system for transmitting data from the mobile sensing station to the central controller.

While FIG. 1 illustrates an uplink from the mobile sensing station to a satellite, the mobile sensing station can communicate with the central controller by means of a cellular telephone system. In this variation, a standard base unit is substituted for ground station 105, and the mobile sensing station carries a cellular transceiver capable of automatically accessing base stations as it passes from one cell into another. While such equipment may be more complex and expensive than the satellite uplink embodied in FIG. 1, it facilitates easy communication of instructions from the central controller to the mobile sensing station. The immediate transmission of such instructions may not always be easily facilitated with currently available satellite systems although such immediate access will be available upon completion of presently planned installations.

The central controller 107 stores the data sent from the mobile sensing station and arranges it so that it can be used in a display indicating the occurrence of predetermined conditions along the route travelled by vehicle 101. The central controller is expected to handle data from a variety of routes, each travelled by a plurality of vehicles having mobile sensing stations. Data regarding specific transport routes or specific vehicles can be accessed over a communications link 108 by a user terminal 109, remotely located from the central controller. Since the data is transmitted from the mobile sensing station in ASCII format, the user terminal can access selected data from the central controller using a personal computer (pc), a modem and the appropriate software. With the appropriate software a display of the desired transport route can be generated at the PC terminal, and the conditions along the transport route can be updated as information is received from various vehicles having mobile sensing stations travelling along that route.

It is noted that although one mobile sensing station 102 is illustrated on vehicle 101, more than one sensing station can be used on each vehicle depending upon the conditions to be detected. Vehicles of extended length such as tractor trailer arrangements or railroad trains can have mobile sensing stations located at various points along their length to monitor specific phenomena occurring with respect to the vehicles as they pass along the transport route.

Figure 2:
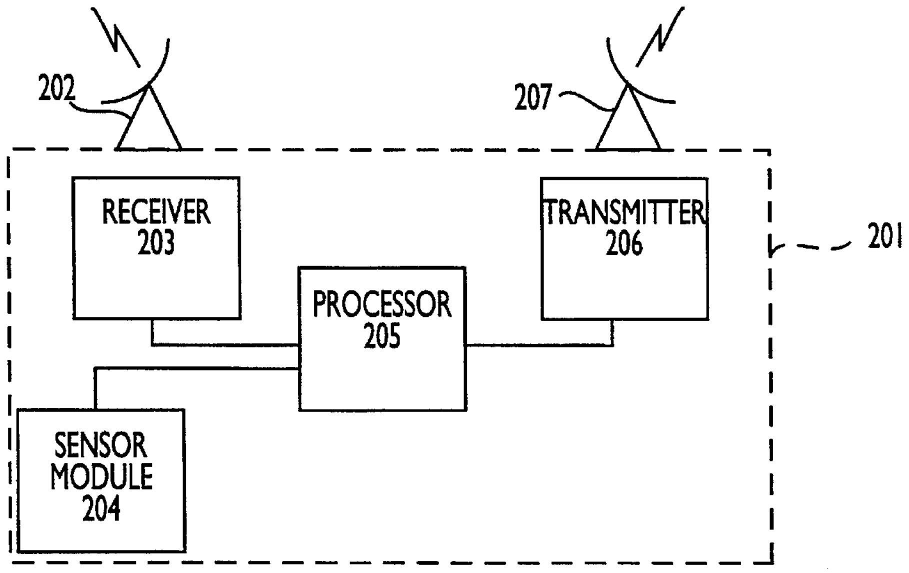
FIG. 2 is a block diagram illustrating the elements contained in a mobile sensing station for one preferred embodiment of the present invention.

FIG. 2 illustrates one example of a mobile sensing station 201. Antenna 202 is used to receive navigational data from a navigational system such as LORAN-C. The data is demodulated in receiver 203 so that it can be stored and/or operated on by processor 205. The navigational data is correlated with the appropriate occurrences of the predetermined conditions detected by sensor module 204. The processor also correlates time and date information to the appropriate data corresponding to the occurrence of predetermined conditions detected along the transport route.

Sensor module 204 can be of a single sensor type or of a plurality of different types connected so that indication of a variety of predetermined conditions can be transmitted to processor 205. The sensor modules can be located as part of the mobile sensing station package or can be remotely located throughout the vehicle. The sensors can be used to detect a variety of different vehicle conditions, transport route conditions, and cargo conditions. In one embodiment, the sensor module includes an accelerometer capable of three-axis measurement of acceleration vs. time. In many cases, this is the only sensor data that is needed to determine if transport route conditions are appropriate for the cargo being transported.

After correlating the location data from receiver 203 and the sensor 204, data processor 205 sends the correlated data to transmitter 206 which transmits the correlated data to the satellite 104 via antenna 207. It is a feature of the invention that a transceiver can be substituted for transmitter 206 so that the satellite system can accommodate transmission of data from satellite 104 (in FIG. 1) to the mobile sensing station. One such system capable of providing such operation is the satellite communication system operated by American Mobile Satellite Corporation, through its subsidiary, AMSC Subsidiary Corporation, which may be used to facilitate one embodiment of the present invention.

In one illustrative embodiment wherein a three-axis accelerometer is used, the system has the capability of recording acceleration transients on each measurement axis which exceed a factory preset value of 3 Gs as a trigger threshold, and which occur within a 256 millisecond time window. The system records the highest acceleration level reached during this time window, and the exact date and time at which it occurred. The system continues to operate in this fashion until either it has accumulated a total of 248 peak readings or is interrupted for data download by a remote host terminal such as the central controller 107. This particular version of the mobile sensing station may be constituted by a ride recording device such as or similar to the environmental data recorder manufactured by Instrument Sensor Technology in Lansing, Mich. The accelerometers in this type of device have a measurement range of 0 to ±10 g, and a resolution of ±0.04 g. The mobile sensing station is preferably provided with a standard RS-232 serial communication interface with command protocol supplied for customer integration with the host terminal computer for control and data transfer.

While the mobile sensing station 201 may be triggered as described in the previous paragraph, other modes of triggering may also be accomplished. For example, the transmission of data can be triggered by a single occurrence of the predetermined conditions, or by some combination of conditions. Triggering may also occur periodically regardless of the number or types of detected predetermined conditions. In the embodiment wherein a transceiver is substituted for transmitter 206 and the communication system between the central controller and the mobile sensing station provides continuous communication, a control signal from the central controller may be transmitted to antenna 207, received by transceiver 206, and used to trigger processor 205.

It is not necessary that the location data be transmitted at the same time as the data regarding the occurrences of the predetermined conditions. Under some system conditions, data regarding the occurrence of the predetermined conditions may be sent as soon as the triggering operation occurs, and a proximity position report may follow within a few minutes. The coordination between the two types of data may be adjusted by processor 205 based upon system parameters and other operating requirements as are necessary to provide a real-time data input of transport route conditions. For example, the second-by-second correlation of positional data with data regarding the predetermined conditions is not critical in a railway switching yard since the vehicle spends a substantial amount of time in the same location while being switched. On the other hand, a vehicle travelling at high speed along a transport route which may be unfamiliar will require positional data to be closely correlated with that of the predetermined conditions detected along the transport route.

Although a number of arrangements of the invention have been mentioned by way of example, it is not intended that the invention be limited thereto. Accordingly, the invention should be considered to include any and all configuration, modifications, variations, combinations or equivalent arrangements falling within the scope of the following claims.

What is claimed is:

1. A method of mapping occurrences of predetermined conditions along a transport route travelled by a vehicle storing cargo and equipped with a mobile sensing station connected to a central controller via a first communications system, comprising the steps of:

(a) continuously detecting for occurrences of said predetermined conditions to said vehicle along said transport route, said predetermined conditions indicating that said cargo is adversely impacted as a result of said vehicle experiencing said predetermined conditions;

(b) storing data regarding said occurrences of said predetermined conditions as well as time and date data corresponding to said occurrences of said predetermined conditions;

(c) receiving positional data;

(d) correlating said positional data with data corresponding to said occurrences of said predetermined conditions producing correlated data;

(e) triggering said mobile sensing station;

(f) transmitting said correlated data over said first communications system to said central controller in response to said triggering step; and (g) transmitting said correlated data from said central controller and displaying said correlated data so as to identify positions on said transport route at which said occurrences of said predetermined conditions are detected to vehicles travelling along said transport route, enabling the vehicles storing cargo that travel along said transport route to be advised of said predetermined conditions.

2. The method of claim 1, wherein said step of continuously detecting comprises determining acceleration of the vehicle along at least one axis.

3. The method of claim 2, wherein the acceleration is determined along three orthogonal axes.

4. The method of claim 1, wherein said step of displaying is carried out continuously.

5. The method of claim 1, wherein said step of transmitting (f) comprises:

sending said correlated data to an orbiting satellite;

relaying said correlated data from said orbiting satellite to an earth station; and sending said correlated data from said earth station to said central controller.

6. The method of claim 1, wherein said step of triggering occurs in response to one of said detected occurrences of said predetermined conditions along said transport route.

7. The method of claim 1, wherein said step of triggering occurs in response to the detection of a plurality of said occurrences of said predetermined conditions along said transport route.

8. The method of claim 1, wherein said step of triggering occurs periodically and is initiated at said mobile sensing station.

9. The method of claim 1, wherein said step of triggering occurs in response to a signal initiated at said central controller.

10. The method of claim 1, wherein said step of transmitting (f) further comprises the steps of:

sending said correlated data from said central controller via a second communications system to a user terminal.

11. The method of claim 1, wherein said step of transmitting (f) comprises the steps of sending said correlated data to a base station of a cellular telephone system; and sending said correlated data from said base station to said central controller.

12. The method of claim 1, further comprising the step of performing corrective measures to minimize the impact of said predetermined conditions and to minimize the adverse impact on said cargo stored in said vehicle responsive to said correlated data on said transport route at which said occurrences of said predetermined conditions are detected.

13. A system for mapping occurrences of predetermined conditions along a transport route travelled by vehicle storing cargo, comprising:

at least one mobile sensing station mounted on a vehicle traversing said transport route, said mobile sensing station including means for continuously detecting occurrences of said predetermined conditions along said transport route to said vehicle, said predetermined conditions indicating that said cargo is adversely impacted as a result of said vehicle experiencing said predetermined conditions, means for receiving positional data, means for storing data representing occurrences of said predetermined conditions and time and date data corresponding to each occurrence of said predetermined conditions, means for correlating said positional data with corresponding occurrences of said predetermined conditions, and first means for transmitting said correlated data in response to a triggering condition;

a first communications system; and a central controller, said central controller including means for receiving said correlated data via said first communications system from said mobile sensing station, and means for transmitting and displaying said correlated data so as to identify positions along said transport route at which said occurrences of said predetermined conditions are detected to vehicles travelling along said transport route, enabling the vehicles storing cargo that travel along said transport route to be advised of said predetermined conditions.

14. The system of claim 13, further comprising a second communications system linking said central controller and at least one user terminal, said central controller further including means for transmitting said correlated data to said user terminal.

15. The system of claim 14, wherein said central controller further includes second means for receiving requests to access said correlated data from said user terminal.

16. The system of claim 15, wherein said central controller further includes means for transmitting a trigger signal to said mobile sensing station to initiate transmission of said correlated data from said mobile sensing station.

17. The system of claim 13, wherein said positional data is derived by said mobile sensing station from data transmitted from an orbiting satellite location system.

18. The system of claim 13, wherein said first means for transmitting operates responsive to a detection of one of said occurrences of said predetermined conditions in said transport route.

19. The system of claim 13, wherein said first means for transmitting operates in response to detection of a plurality of said occurrences of said predetermined conditions in said transport route.

20. The system of claim 13, wherein said first means for transmitting operates periodically.

21. The system of claim 13, wherein said first means for transmitting operates in response to a trigger signal sent by said central controller.

22. The system of claim 15, wherein said means for displaying is located at said user terminal, and said user terminal includes means for requesting access to said correlated data at said central controller.

23. The system of claim 22, wherein said means for requesting access comprises a modem and a personal computer.

24. The system of claim 14, wherein said second communications systems comprises a switched telephone network.

25. The system of claim 14, wherein said second communications system comprises a data link.

26. The system of claim 13, wherein said first communications system comprises a cellular telephone network.

27. The system of claim 13, wherein said first means for transmitting said correlated data is in an ASCII format.

28. The system of claim 13, wherein said means for continuously detecting comprises an accelerometer arranged to detect acceleration with respect to time along three orthogonal axes.

29. The system of claim 13, wherein the means for displaying is arranged to operate continuously.

30. The system of claim 13, wherein, responsive to said means for displaying said correlated data on said transport route at which said occurrences of said predetermined conditions are detected, the vehicles travelling along the transport route perform corrective measures to minimize the impact of said predetermined conditions and to minimize the adverse impact on said cargo stored in the corresponding vehicle.

31. A system for mapping occurrences of predetermined conditions along a transport route travelled by vehicle storing cargo, comprising:

at least one mobile sensing station mounted on a vehicle traversing said transport route, said mobile sensing station continuously detecting occurrences of said predetermined conditions along said transport route to said vehicle, said predetermined conditions indicating that said cargo is adversely impacted as a result of said vehicle experiencing said predetermined conditions, receiving positional data, correlating said positional data with corresponding occurrences of said predetermined conditions, and transmitting said correlated data; and a central controller receiving said correlated data from said mobile sensing station, transmitting and displaying said correlated data so as to identify positions along said transport route at which said occurrences of said predetermined conditions are detected to vehicles travelling along said transport route, enabling the vehicles storing cargo that travel along said transport route to be advised of said predetermined conditions.

32. The system of claim 31, wherein, responsive to said means for displaying said correlated data on said transport route at which said occurrences of said predetermined conditions are detected, the vehicles travelling along the transport route perform corrective measures to minimize the impact of said predetermined conditions and to minimize the adverse impact on said cargo stored in the corresponding vehicle.

33. The system of claim 32, wherein the vehicles are advised of said predetermined conditions in real-time to perform said corrective measures substantially immediately after said predetermined conditions occur.

34. A method of mapping occurrences of predetermined conditions along a transport route travelled by a vehicle storing cargo and equipped with a mobile sensing station connected to a central controller via a first communications system, comprising the steps of:

(a) continuously detecting for occurrences of said predetermined conditions to said vehicle along said transport route, said predetermined conditions indicating that said cargo is adversely impacted as a result of said vehicle experiencing said predetermined conditions;

(b) receiving positional data and correlating said positional data with data corresponding to said occurrences of said predetermined conditions producing correlated data, and transmitting said correlated data to a central controller; and (c) transmitting said correlated data from said central controller and displaying said correlated data so as to identify positions on said transport route at which said occurrences of said predetermined conditions are detected to vehicles storing cargo travelling along said transport route, enabling the vehicles that travel along said transport route to be advised of said predetermined conditions.

35. The method of claim 34, further comprising the step of performing corrective measures to minimize the impact of said predetermined conditions and to minimize the adverse impact on said cargo stored in said vehicle responsive to said correlated data on said transport route at which said occurrences of said predetermined conditions are detected.

36. The method of claim 35, wherein the vehicles are advised of said predetermined conditions in real-time to perform said corrective measures substantially immediately after said predetermined conditions occur.

* * * * *

UNITED STATES PATENT AND TRADEMARK OFFICE

CERTIFICATE OF CORRECTION

PATENT NO. 5,475,597

DATED December 12, 1995

INVENTOR(S) James C. BUCK et al.

It is certified that error appears in the above-indentified patent and that said Letters Patent is hereby corrected as shown below:

On the title page, item [75] should read as follows:

--[75] Inventors: James C. Buck, Reston, VA; Thomas J. Schoenleben, Jacksonville, FL; Joseph A. Gruessing, Jr., Reston, VA; Patrick Brant, Reston, VA; James Early, Herndon, VA--

Signed and Sealed this

Fifteenth Day of October, 1996

*Attest:*

Bruce Lehman

BRUCE LEHMAN

*Attesting Officer*

*Commissioner of Patents and Trademarks*